United States Patent
Salmon et al.

(10) Patent No.: US 8,761,976 B2
(45) Date of Patent: Jun. 24, 2014

(54) SYSTEM AND METHOD FOR CONTROLLING A TROLLING MOTOR

(75) Inventors: Paul D. Salmon, Mankato, MN (US); David Charles Evers, Acworth, GA (US)

(73) Assignee: Johnson Outdoors Inc., Racine, WI (US)

( * ) Notice: Subject to any disclaimer, the term of this patent is extended or adjusted under 35 U.S.C. 154(b) by 372 days.

(21) Appl. No.: 13/174,944

(22) Filed: Jul. 1, 2011

(65) Prior Publication Data
US 2012/0015566 A1    Jan. 19, 2012

Related U.S. Application Data

(60) Provisional application No. 61/364,855, filed on Jul. 16, 2010.

(51) Int. Cl.
*G01C 21/00* (2006.01)

(52) U.S. Cl.
USPC .................. 701/21; 701/468; 440/6; 440/84

(58) Field of Classification Search
USPC ........ 701/21, 22, 23, 412, 425, 468; 318/588, 318/551, 548; 440/6, 84
See application file for complete search history.

(56) References Cited

U.S. PATENT DOCUMENTS

| | | | |
|---|---|---|---|
| 4,428,052 A | 1/1984 | Robinson et al. | |
| 4,597,069 A | 6/1986 | Milano et al. | |
| 5,172,324 A | 12/1992 | Knight | |
| 5,268,844 A | 12/1993 | Carver et al. | |
| 5,309,408 A | 5/1994 | Bick et al. | |
| 5,362,263 A | 11/1994 | Petty | |
| 5,386,368 A | 1/1995 | Knight | |
| 5,400,300 A | 3/1995 | Bick et al. | |
| 5,546,695 A | 8/1996 | Langer | |
| 5,884,213 A | 3/1999 | Carlson | |
| 6,208,758 B1 | 3/2001 | Ono et al. | |
| 6,256,585 B1 | 7/2001 | Shannon | |
| 6,273,771 B1 * | 8/2001 | Buckley et al. | 440/84 |
| 6,678,589 B2 * | 1/2004 | Robertson et al. | 701/21 |
| 6,750,815 B2 | 6/2004 | Michaelson et al. | |
| 6,873,570 B2 | 3/2005 | Zhu et al. | |
| 6,934,608 B2 | 8/2005 | Qureshi | |
| 6,934,657 B1 | 8/2005 | Carlson et al. | |
| 7,124,022 B2 | 10/2006 | Carmichael et al. | |
| 7,209,829 B2 | 4/2007 | Litvack et al. | |
| 7,266,532 B2 | 9/2007 | Sutton et al. | |
| 7,268,703 B1 | 9/2007 | Kabel et al. | |

(Continued)

OTHER PUBLICATIONS

U.S. Appl. No. 13/110,587, filed May 18, 2011, Wood et al.

*Primary Examiner* — Richard Camby
(74) *Attorney, Agent, or Firm* — Reinhart Boerner Van Deuren P.C.

(57) ABSTRACT

A trolling motor control system that includes a main controller configured interface with a trolling motor. The main controller is configured to control the output power and directional heading of the trolling motor. In at least one embodiment, the main controller has an electronic interface configured to establish a two-way day data connection between the main controller and an electronic GPS-equipped mapping device. This two-way connection allows the main controller to use data stored on the GPS-equipped mapping device to execute functions of the trolling motor control system. It also allows functions of the trolling motor control system to be executed via controls on the GPS-equipped mapping device.

43 Claims, 3 Drawing Sheets

(56) References Cited

U.S. PATENT DOCUMENTS

| | | |
|---|---|---|
| 7,313,404 B2 | 12/2007 | Anderson |
| 7,538,511 B2 * | 5/2009 | Samek ............ 318/588 |
| 7,769,504 B2 | 8/2010 | Kaji |
| 7,940,602 B1 | 5/2011 | Korolenko |
| 8,296,001 B1 | 10/2012 | Kabel et al. |
| 2004/0249860 A1 | 12/2004 | Stechschulte et al. |
| 2006/0089794 A1 | 4/2006 | DePasqua |
| 2008/0169779 A1 * | 7/2008 | Samek ............ 318/588 |
| 2009/0037040 A1 | 2/2009 | Salmon et al. |
| 2009/0067750 A1 | 3/2009 | Pryszo et al. |
| 2009/0069962 A1 | 3/2009 | Aharon et al. |
| 2009/0147623 A1 | 6/2009 | Betts et al. |
| 2010/0131133 A1 | 5/2010 | Koda et al. |
| 2011/0054784 A1 | 3/2011 | Wood et al. |
| 2011/0054785 A1 | 3/2011 | Wood et al. |
| 2011/0258901 A1 | 10/2011 | Garrett |
| 2012/0015566 A1 | 1/2012 | Salmon |
| 2012/0232719 A1 | 9/2012 | Salmon et al. |

* cited by examiner

SYSTEM AND METHOD FOR CONTROLLING A TROLLING MOTOR

CROSS-REFERENCE TO RELATED PATENT APPLICATIONS

This patent application claims the benefit of U.S. Provisional Patent Application No. 61/364,855, filed on Jul. 16, 2010, the teachings and disclosures of which are hereby incorporated in their entireties by reference thereto.

FIELD OF THE INVENTION

This invention generally relates to trolling motors, and, more particularly, to systems configured to control trolling motors.

BACKGROUND OF THE INVENTION

Electric trolling motors are available that are controlled by hand using a tiller, by a foot pedal that is connected to the trolling motor, by wireless foot pedal control, and by handheld remote control devices. Wireless remote control devices have the advantage of eliminating cables that can otherwise get in the way of an angler, and provide the opportunity for the angler to control operation of the motor even when the angler is in another part of the boat. With systems using wireless remote control, the remote control transmits commands to a receiver that is connected to the motor. In this manner, the angler can control various functions of the trolling motor, such as steering, turning the propeller on or off, and either increasing or decreasing motor speed. A wireless control system for marine devices, such as an electric trolling motor, is described in patent application Ser. No. 11/888,945, filed on Aug. 3, 2007 by the inventor of the present Application, the teachings and disclosure of which are incorporated in their entireties herein by reference thereto.

Many fishing boats are now equipped with an electronic fish finder or chart plotter. Often, these fish finders include a GPS receiver and some level of mapping for the waterways they are navigating. Anglers routinely use their fish finders or chart plotters to mark (record) the locations of productive fishing spots. These spots are also referred to as waypoints. Sometimes instead of marking an individual spot, they will also record a track that follows a shoreline or some sequence of spots. These spots and tracks are used by the angler during return trips to these areas to allow them to quickly bring the boat to the potentially productive fish habitats. U.S. Pat. No. 5,386,368, issued to Knight, describes an apparatus for maintaining a boat in a fixed position, the teachings and disclosure of which are incorporated in their entireties herein by reference thereto. Further, U.S. Pat. No. 5,884,213, issued to Carlson, describes a system for controlling navigation of a fishing boat, the teachings and disclosure of which are incorporated in their entireties herein by reference thereto.

Anglers can use a trolling motor control system to steer the boat to a desired waypoint previously recorded by the trolling motor control system, or to electronically steer the boat along a previously recorded path, or track. U.S. Pat. No. 5,172,324, issued to Knight, describes an electronic steering system for controlling the heading of a watercraft, the teachings and disclosure of which are incorporated in their entireties herein by reference thereto. However, with some conventional trolling motor control systems, the system has a limited amount of memory in which to store recorded waypoints and recorded tracks. Further, these conventional trolling motor control systems may not have sufficient memory to store maps of various fishing locations. Moreover, some conventional trolling motor control systems have limited display capabilities and may not be able to optimally display maps or recorded tracks and waypoints.

Embodiments of the invention represent an advancement over the prior art. The advantages of the invention, as well as additional inventive features, will be apparent from the description of the invention provided herein.

BRIEF SUMMARY OF THE INVENTION

In one aspect, embodiments of the invention provide a trolling motor control system that includes a main controller configured to interface with, a trolling motor. The main controller is configured to control the output power and the directional heading of the trolling motor. In at least one embodiment, the main controller has an electronic interface configured to establish a two-way day data connection between the main controller and an electronic GPS-equipped mapping device. This two-way connection allows the main controller to use data stored on the GPS-equipped mapping device to execute functions of the trolling motor control system. It also allows functions of the trolling motor control system to be executed via controls on the GPS-equipped mapping device.

In a particular embodiment of the invention, the trolling motor control system includes a wireless remote control device having a display screen and input means, the wireless remote control device configured to wirelessly communicate with the main controller to cause, via the input means, the main controller to execute functions of the trolling motor control system.

In another aspect, embodiments of the invention provide a method of controlling a trolling motor on a watercraft that includes coupling a module of a trolling motor control system to a trolling motor. In an embodiment of the invention, the module is configured to transmit signals to the trolling motor for controlling an output power of the trolling motor and a directional heading of the watercraft via the trolling motor. The method also includes establishing a two-way data link between the trolling motor control system and an electronic GPS-equipped mapping device, and configuring the trolling motor control system to use the two-way data link to access data stored on the electronic GPS-equipped mapping device in order to execute functions of the trolling motor control system.

In yet another aspect, embodiments of the invention provide a trolling motor configured to be used on a boat, the trolling motor having one or more mechanisms for the manual control of the speed and direction of the trolling motor, and a control system for regulating operation of the trolling motor. The control system includes a main controller configured to control an output power of the trolling motor and a directional heading of the watercraft via the trolling motor. Further, the main controller includes an electronic interface configured to establish a two-way data connection between the main controller and an electronic GPS-equipped mapping device, such that the main controller can use data stored on the GPS-equipped mapping device to execute functions of the trolling motor, and such that functions of the trolling motor can be executed via controls on the GPS-equipped mapping device.

In a particular embodiment of the invention, the main controller includes a main control module, a GPS receiver, an electronic compass, and a wireless interface, and the functions of the trolling motor can be controlled using a wireless remote control device having a display screen and input means, the wireless remote control device configured to wirelessly communicate with the main controller to cause, via the input means, the main controller to execute functions of the trolling motor.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As stated above, many fish finders and chart plotters today have GPS capability, and many fish finders having mapping capability. A number of these GPS-equipped mapping devices also have some type of data bus connection to allow for the connection of peripheral devices, such as GPS receivers, environmental sensors, and other accessories. This data bus could use any one of several architectures including, but not limited to, NMEA 0183, NMEA 2000, Ethernet, or Controller Area Network (CAN). Also, the peripheral devices could be hard-wired to the fish finder or connected via a wireless connection.

Figure 1:
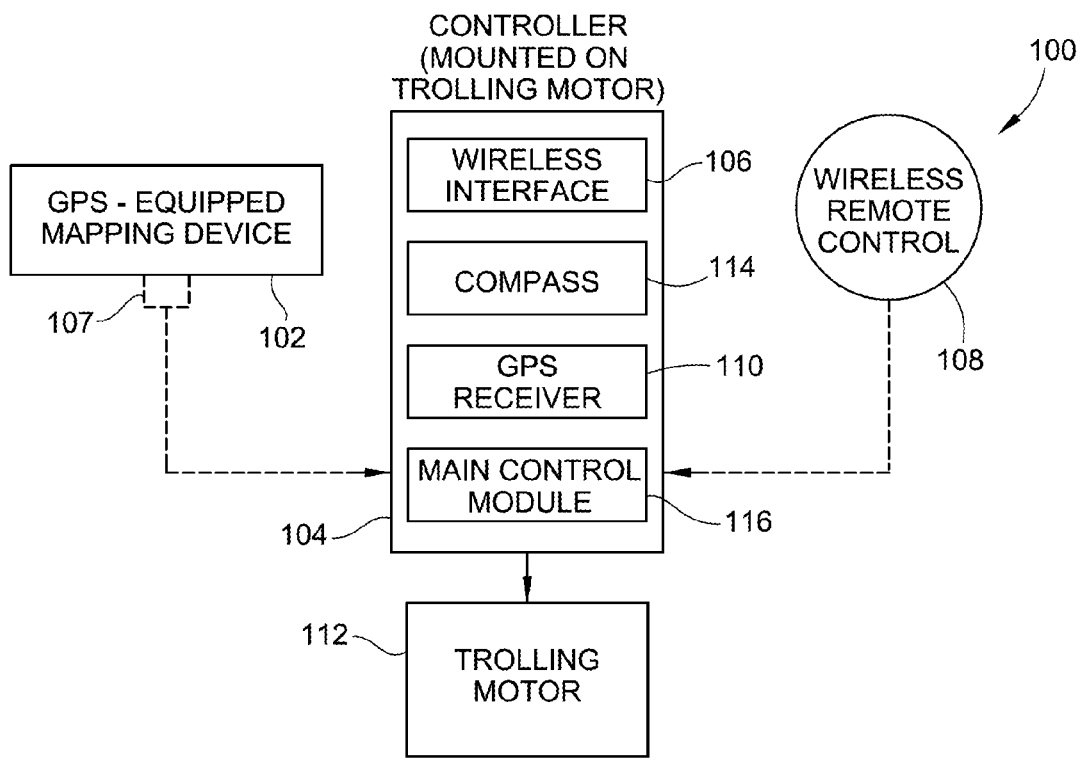
FIG. 1 is a block diagram showing an exemplary implementation of a trolling motor control system, according to an embodiment of the invention.

FIG. 1 is a block diagram showing the connection between a GPS-equipped mapping device 102, such as a fish finder or chart plotter, and a trolling motor control system 100, according to an embodiment of the invention. The trolling motor control system 100 includes a main controller 104 and a wireless remote control device 108. The connection between the GPS-equipped mapping device 102 and the main controller 104 could be wired or wireless. The main controller 104 includes a wireless interface 106 that allows for the bidirectional, wireless transfer of data between the main controller 104 and either the GPS-equipped mapping device 102 or the wireless remote control device 108. To allow for wireless communication between the main controller 104 (via wireless interface 106) and the GPS-equipped mapping device 102, the latter may include a wireless interface module 107 (shown in phantom) connected to a port, such as an Ethernet port or possibly a proprietary connection port, on the GPS-equipped mapping device 102.

In alternate embodiments of the invention, the interface between the GPS-equipped mapping device 102 and main controller 104 is wired. In this case, a wire running from the main controller 104 through the watercraft, which in certain embodiments is a boat of the type typically used by anglers, to the GPS-equipped mapping device 102. As stated above, the GPS-equipped mapping device 102 may have an Ethernet port or a proprietary connection port for connection to wire.

In an embodiment of the invention, the main controller 104 further includes a GPS receiver 110, and electronic memory which allows the user of the trolling motor control system 100 to store the latitudinal and longitudinal information for a waypoint, or for a series of waypoints that, together, make up a path or track. A track is a course that has been followed by the watercraft or boat, and which can be recorded by the main controller 104, or by the GPS-equipped mapping device 102 in some instances. In the main controller 104, or in the GPS-equipped mapping device 102, the track is represented by a series of waypoints, which may be separated from adjacent waypoints by some relatively fixed spacing. Alternately, the series of waypoints may be recorded with some relatively fixed time interval between the recording of adjacent waypoints. In either case, by controlling the trolling motor 112 to travel from a first waypoint in the series to a last waypoint in the series, the trolling motor control system 100 allows the user to follow any previously recorded track stored in the main controller 104, or in the GPS-equipped mapping device 102.

The GPS receiver 110, electronic compass 114, and main control module 116 also enable other functions of the main controller 104 such as electronic anchoring, also known as spot-locking (i.e., controlling the trolling motor 112 such that the unanchored boat or watercraft maintains its position despite waves and currents that might otherwise cause the boat to move).

Additionally, the GPS receiver 110, electronic compass 114, and main control module 116 enable the trolling motor control system 100 to perform an autopilot function that causes the trolling motor 112 to automatically maintain a predetermined course or heading and to correct for any effects of wind, waves or currents on the boat. The main control module 116 interfaces with the trolling motor 112, and transmits command signals from the main controller 104 to the trolling motor 112 to controls the operation (i.e., speed, heading) thereof. In certain embodiments, the main controller 104 is mounted on the trolling motor 112, and is configured to transmit control signals directly to the trolling motor 112. In an alternate embodiment, the main controller 104 is located on the boat remote from the trolling motor 112, wherein the main controller 104 communicates (wired or wirelessly) with the trolling motor 112 to transmit control signals thereto.

In operation, the two-way data connection between the main controller 104 and the GPS-equipped mapping device 102 makes it possible for the trolling motor control system 100 to take advantage of various capabilities of the GPS-equipped mapping device 102. Typically, the GPS-equipped mapping device 102 will have built mechanisms to allow the user to rename and categorize recorded waypoints and tracks. Many fish finders and chart plotters have a substantial amount of memory for storing waypoints and tracks. Generally, the amount of built-in data storage in a typical high-end chart plotter or fish finder is much greater than that likely to be employed in the trolling motor control system 100. However, the two-way data connection allows for the trolling motor control system 100 to use the GPS-equipped mapping device 102 as a mass storage device. In a particular embodiment, the trolling motor control system 100 can use the waypoints and tracks stored in the GPS-equipped mapping device 102 to carry out functions such as spot-locking, and following a recorded track. In particular embodiments, the GPS-equipped mapping device 102 includes a built-in mechanism that allows the user to rename and categorize waypoints and tracks. This would allow the user to easily keep track of recorded waypoint and tracks specifically categorized for use with the trolling motor control system 100.

The GPS-equipped mapping device 102 will normally include a large LCD display and some type of keypad configuration for navigating through the screens and making selections. In embodiments of the invention, additional screens and menu selections are added for performing specific functions of the trolling motor control system 100. Such functions may include: selecting modes of operation, selecting waypoints to be used for the spot-lock function, selecting stored tracks to be used for following a recorded track to either the start of the track or the end of the track, making configuration selections for how certain specific trolling motor control system 100 functions would operate.

Typically, the GPS-equipped mapping device 102 will have one or more built-in maps with some level of detail. The maps may show the perimeter of lakes and streams in which the user can direct the boat, but can also include depth contours or 3-D representations of the topography of the lake bed. In some cases, the GPS-equipped mapping device 102 will have card slots to allow the user to install upgraded maps. Through the use of these maps, it becomes much easier to determine the actual location of the waypoints and tracks that are recorded and stored on the GPS-equipped mapping device. In addition, in at least one embodiment, the GPS-equipped mapping device 102 will be able to show the boat's location on the map, and can also display this on the GPS-equipped mapping device display superimposed on top of the maps. With the boat, local waypoints and local tracks all on the GPS-equipped mapping device display, the user can more easily identify the correct waypoint or track to be used by the trolling motor control system 100.

Also, in some instances, the GPS-equipped mapping device 102 will have the ability to have its software upgraded either through a memory card or through a connection to a PC. Because of the two-way data connection between the main controller 104 and GPS-equipped mapping device 102, in certain embodiments of the invention, it will be possible to upgrade the software in the trolling motor control system 100 through the GPS-equipped mapping device 102. As a result, embodiments of the trolling motor control system 100 can be constructed without a dedicated programming connector, thus making assembly of the trolling motor control system 100 faster and less expensive.

Figure 2:
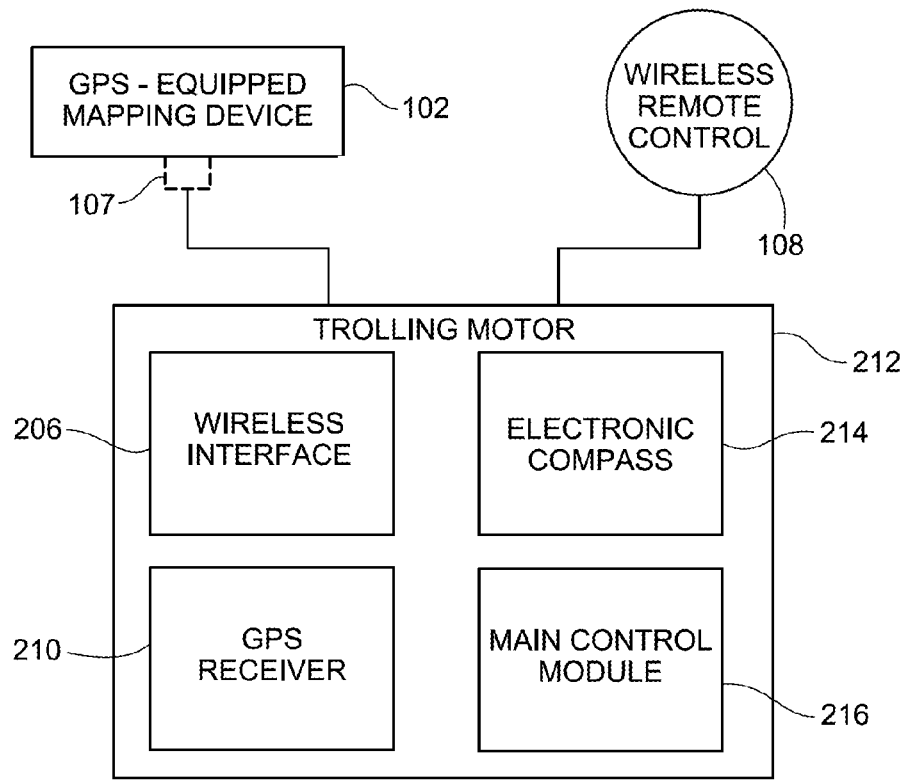
FIG. 2 is a block diagram showing an exemplary implementation of a trolling motor with an integrated trolling motor control system, according to an embodiment of the invention.

FIG. 2 is a block diagram showing the connection between the GPS-equipped mapping device 102, such as a fish finder or chart plotter, and a trolling motor 212 having the functions of the main controller 104 (shown in FIG. 1) integrated into the trolling motor 212. In a particular embodiment, the trolling motor 212 is an electric motor configured for mounting to the bow or the transom of a boat. The trolling motor 212 also includes one or more mechanisms for the manual control of the speed and direction of the trolling motor. The connection between the GPS-equipped mapping device 102 and the trolling motor 212 can be wired or wireless. As in the above embodiment, the GPS-equipped mapping device 102 includes wireless interface module (shown in phantom) when the interface between the GPS-equipped mapping device 102 and trolling motor 212 is wireless. As shown in FIG. 2, the trolling motor includes a wireless interface 206, an electronic compass 214, a GPS receiver 210, and a main control module 216. The wireless remote control device 108 communicates directly with the trolling motor 212, via the wireless interface 206. However, in all other respects, GPS receiver 210, electronic compass 214, and main control module 216 give the trolling motor 212 includes all of the functionality of the trolling motor 112, shown in FIG. 1, with its accompanying main controller 104.

Figure 3:
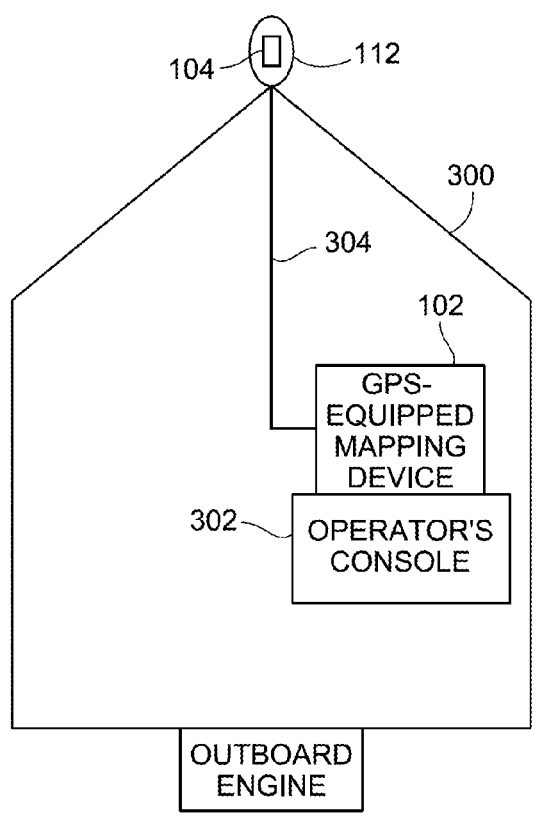
FIGS. 3 and 4 illustrate examples of a boat or watercraft incorporating an embodiment of the invention.

FIG. 3 is a schematic illustration of a boat 300 with a bow-mounted trolling motor 112 and a trolling motor control system 100 (shown in FIG. 1), according to an embodiment of the invention. In the embodiment of the invention shown, the main controller 104 is mounted to the trolling motor 112, though in alternate embodiments, the main controller 104 could be located elsewhere on the boat, for example at an operator's console 302. In such an embodiment, the main controller 104 would transmit control signals (wired or wirelessly) to operate the trolling motor 112. The boat 300 includes GPS-equipped mapping device 102, which could be an electronic fish finder or a chart plotter, located at or near the operator's console 302. The connection 304 between the main controller 104 and the GPS-equipped mapping device 102 could be wired or wireless. The boat's operation could be controlled as described above via functions of the trolling motor control system 100 initiated by a user having the wireless remote control device 108 (shown in FIG. 1).

Figure 4:
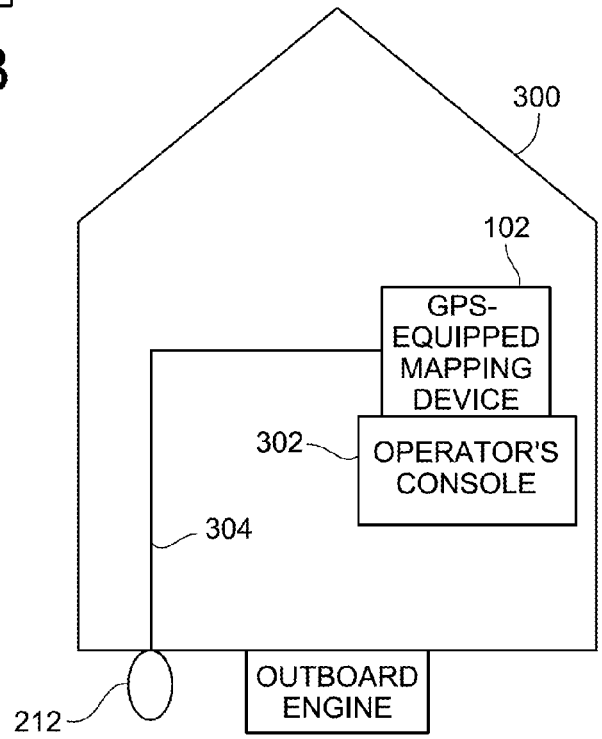

FIG. 4 is a schematic illustration of a boat 300 with transom-mounted trolling motor 212, according to an embodiment of the invention. The boat 300 includes GPS-equipped mapping device 102, which could be an electronic fish finder or a chart plotter, located at or near the operator's console 302. The connection 304 between the trolling motor 212 and the GPS-equipped mapping device 102 could be wired or wireless. The boat's operation could be controlled as described above via functions of the trolling motor 212 initiated by a user having the wireless remote control device 108 (shown in FIG. 2).

Figure 5:
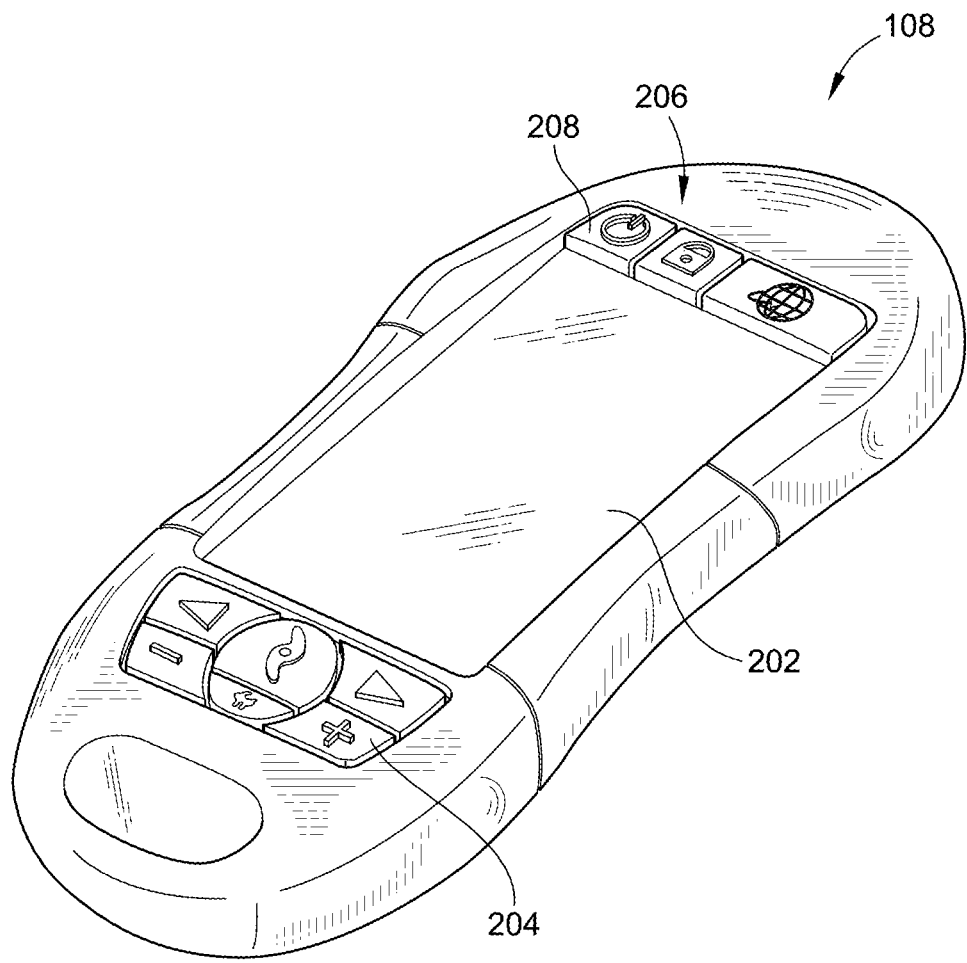
FIG. 5 is an illustration of an exemplary remote control device usable with the trolling motor control system of FIG. 1 and the trolling motor of FIG. 2.

FIG. 5 is an illustration of the wireless remote control device 108, according to an embodiment of the invention, and usable with the trolling motor control system 100 of FIG. 1 and the trolling motor 212 of FIG. 2. In certain embodiments of the invention, the wireless remote control device 108 has a user interface that includes a display screen 402 and a keypad 404. The embodiment shown in FIG. 5 also includes a top row of buttons 406 along the top of the display screen 402. As shown, the top row of buttons 406 includes a button 408 to power the wireless remote control device 108 on or off. In particular embodiments, the keypad 404 includes buttons for navigating through menus, configuration screens, or through multiple soft keys. The display screen 402 could be an LCD display, LED display, or some other suitable type of display. It is also envisioned that the display screen 402 could be a touch-screen configured to accept input commands from the user. Such a touch screen display could allow for the elimination of buttons on the keypad 404 or in the top row of buttons 406. In a particular embodiment, the wireless remote control device 108 is the primary user interface for controlling the trolling motor 112, 212, whether directly controlling the trolling motor's functions or using one or a combination of built-in functions to implement automated control of the trolling motor 112, 212. In this case, direct control means that the user could control the speed and heading of the boat via real-time control of the trolling motor 112, 212 through the wireless remote control device 108.

In a particular embodiment, the wireless remote control device 108 may be configured to display a smaller version of the GPS-equipped mapping device's displayed map. As such, the user wouldn't necessarily have to be in front of the GPS-equipped mapping device 102 to identify waypoints and/or tracks that are stored and displayed on the GPS-equipped mapping device 102. This would give the user similar functionality as through the GPS-equipped mapping device 102 for doing things like identifying waypoints and tracks to navigate along. Without the maps on the remote control device 108, the user would have to go by the name of the recorded waypoint or track, or would have to look at the display on the GPS-equipped mapping device 102 in order to choose the correct waypoint or track.

As mentioned above, the display screen 402 for the wireless remote control device 108 may also employ touchscreen technology. This is advantageous in that multiple buttons can be provided through software, such that the system controls would not need to be part of a physical keypad, such as keypad 404 or top row of buttons 406. Such an arrangement saves space on the front of the remote control device 108, thus allowing for a larger display screen 402, and may also provide additional functionality to the user. In an alternate embodiment, the wireless remote control device 108 could use a menu-based approach which would also allow for a minimal number of physical buttons on the keypad 404 where the display does not employ touchscreen technology.

The wireless remote control device 108 could include buttons (on the keypad 404, for example) or soft keys to enable the user to remotely control some standard functions on the GPS-equipped mapping device 102. An example would be a "Mark" button. Typically, on the keypad of many GPS-equipped mapping devices 102, there is a "Mark" button. When this is pressed, the GPS-equipped mapping device 102 automatically records and stores a waypoint with the current GPS coordinates. Doing this through the wireless remote control device 108 would allow the user to record a waypoint without having to go to the keypad of the GPS-equipped mapping device 102, which may be on the other end of the boat. Of course, this capability to execute commands on the GPS-equipped mapping device 102 is in addition to the capability of the wireless remote control device 108 to execute this function, i.e. "Mark" or Record Waypoint, on the main controller 104. It is also envisioned that the wireless remote control device 108 is configured to record and store a series of waypoints, also known as a track. In this case, the user would be able to access this "Record Track" function of the GPS-equipped mapping device 102 using the wireless remote control device 108.

In a particular embodiment of the invention, buttons on the wireless remote control device 108 are configured to change or modify the screen on the GPS-equipped mapping device 102 display. The buttons could be actual buttons on the keypad 404, or soft keys displayed on the remote control device display 402. For example, this would allow the user to continue fishing at the back of the boat while looking at the GPS-equipped mapping device 102 located at a front console which, in some cases, could be a significant distance away from the user. Particular examples of that which the user would be able to change or modify on the GPS-equipped mapping device 102 display include, but are not limited to maps with GPS coordinates, sonar zoomed out, sonar zoomed in, split screen with sonar and GPS, etc. As stated above, smaller versions of these displays could be viewed on the display 402 of the wireless remote control device 108. With this capability built into the wireless remote control device 108, the user could stay in his or her preferred fishing location at the back of the boat, for example, and still command the GPS-equipped mapping device 102 screens to change as desired.

In at least one embodiment, when the trolling motor control system 100 user enables the Spot-Lock function using the remote control device 108, the main controller 104 captures and stores the boat's current GPS coordinates as a waypoint. In a more particular embodiment of the invention, at the same time that the main controller 104, via main control module 116, store's the boat's coordinates, the GPS-equipped mapping device 102 will also record this waypoint corresponding to this Spot-Lock location. In a particular embodiment, the GPS-equipped mapping device 102 can be used to engage the Spot-Lock function of the trolling motor control system 100. The GPS-equipped mapping device 102 may include a drop-down menu or some other suitable method for engaging the Spot-Lock function. In a particular embodiment, the user may engage the Spot-Lock function for a previously recorded waypoint on the track currently being followed by the boat.

When the trolling motor control system 100 user enables the Track-Record function through the remote control device 108, the main controller 104 will begin to capture track waypoints and record them. This string of track waypoints is stored as a track inside the memory of the main controller 104. In at least one embodiment, either during the record process or immediately after recording is completed, an exact copy of the trolling motor control system 100 track is stored in the GPS-equipped mapping device 102 memory. In a particular embodiment, the GPS-equipped mapping device 102 can be used to engage the Track-Record function of the trolling motor control system 100. In a particular embodiment, the GPS-equipped mapping device 102 may include a drop-down menu or some other suitable method for engaging the Track-Record function.

With respect to the Spot-Lock function, this means that any waypoint that is currently stored on the GPS-equipped mapping device 102 can be used by the trolling motor control system 100. Conversely, when the Spot-Lock function is engaged via the wireless remote control device 108 is pressed, the GPS-equipped mapping device 102 may also be configured to "Mark" the location, or, in other words, to record the waypoint at that location. Through the GPS-equipped mapping device 102, in certain embodiments of the invention, the user will be able to identify an existing waypoint and use the wireless remote control device 108, to engage the Spot-Lock function for that waypoint.

In at least one embodiment, track playback (i.e., following the track to the beginning, also known as "Track-to-Start", or following the track to the end, also known as "Track-to-End") can be used for any track that is stored on the GPS-equipped mapping device 102, as well as for tracks stored in the main controller 104. The Track-to-Start and Track-to-End functions can be initiated Also, in a particular embodiment, when the "Track Record" function is initiated in the trolling motor control system 100, the GPS-equipped mapping device 102 will also be recording the same track. Through the GPS-equipped mapping device 102, the user will be able to identify an existing track and instruct the trolling motor control system 100 to use that track to execute a function (e.g., "Track-to-Start" or "Track-to-End" to follow the track to the beginning or to the end).

A user may use the Spot-Lock function to have the trolling motor control system 100 electronically anchor the watercraft at a present location, or a previously recorded location. However, in at least one embodiment of the invention, for safety reasons the boat must be within 0.25 miles of the desired location in order to recall it. If the location is also stored on the GPS-equipped mapping device 102, the user has the option of manually navigating the boat to get it close to the desired waypoint by watching the map on the display of the GPS-equipped mapping device 102. Once the boat is within 0.25 miles of the desired waypoint, the spot-lock function can be used to navigate the boat to the exact location of the waypoint. Similarly, in certain embodiments, the user needs to be within 0.25 miles of some track waypoint in order to engage the Track-to-Start or Track-to-End functions.

However, in at least one embodiment of the invention, the trolling motor control system 100 includes a "Navigate-To" function, which can be initiated via the wireless remote control device 108. This function allows the user to select a stored waypoint, and the trolling motor control system 100 controls the trolling motor 112, 212 thus navigating the boat to the selected waypoint. In an embodiment of the invention, the selected waypoint may be stored in the memory of the main controller 104 or in the memory of the GPS-equipped mapping device 102. Further, in particular embodiments, the user will be able to select from options for the mode of operation once the selected waypoint is reached via the Navigate-To function. For example, the trolling motor control system 100 may go into Spot-Lock mode, or, if the selected waypoint is part of a track, the user may have the trolling motor control system 100 execute a Track-to-Start or Track-to-End function once the waypoint is reached.

As was just described with respect to the Spot-Lock function, in at least one embodiment of the invention, to replay a track that has been recorded by the trolling motor control system 100, the user must get the boat to within 0.25 miles of some waypoint in the recorded track before engaging the "Track-to-Start" function, in which the trolling motor takes the boat to the start of the recorded track, or before engaging the "Track-to-End" function, in which the trolling motor takes the boat to the end of the recorded track. If the track has also been recorded on the GPS-equipped mapping device 102, then the user can use the display on the GPS-equipped mapping device 102 to manually navigate the boat to get within 0.25 miles of any waypoint in the track, then use the "Track-to-Start" or "Track-to-End" function on the trolling motor control system 100 for the final approach.

In at least one embodiment, the GPS-equipped mapping device 102 can be used as an additional user interface (the wireless remote control device 108 being the primary interface). In at least one embodiment, the user interface of the GPS-equipped mapping device 102 is configured to allow the user to enable certain trolling motor control system 100 functions through the GPS-equipped mapping device 102. For example, if the user wanted the trolling motor control system 100 to engage the Spot-Lock function for an existing waypoint shown on the display of the GPS-equipped mapping device 102, the user would be able to engage the Spot-Lock function using a pull-down menu on the GPS-equipped mapping device display. The user could operate the trolling motor control system 100 in this manner in addition to being able to use the wireless remote control device 108 to execute the desired function. In yet another embodiment, additional configuration screens could be added, allowing the user to use the GPS-equipped mapping device 102 to modify, for example, seldom-accessed configuration parameters of the trolling motor control system 100.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A trolling motor control system comprising:
a main controller configured to interface with a trolling motor for a watercraft, wherein the main controller is further configured to control an output power of the trolling motor and a directional heading of the watercraft via the trolling motor, the main controller having an electronic interface configured to establish a two-way data connection between the main controller and an electronic GPS-equipped mapping device such that the main controller can use data stored on the GPS-equipped mapping device to execute functions of the trolling motor control system, and such that functions of the trolling motor control system can be executed via controls on the GPS-equipped mapping device;
wherein the data stored on the GPS-equipped mapping device comprises one or more maps which can be displayed on an electronic display screen.

2. The trolling motor control system of claim 1, wherein the electronic interface is a wireless electronic interface.

3. The trolling motor control system of claim 1, further comprising a wireless remote control device having a display screen and input means, the wireless remote control device configured to wirelessly communicate with the main controller to cause, via the input means, the main controller to execute functions of the trolling motor control system.

4. The trolling motor control system of claim 3, wherein the wireless remote control device is configured to cause the GPS-equipped mapping device to record one or more waypoints.

5. A trolling motor control system comprising:
a main controller configured to interface with a trolling motor for a watercraft, wherein the main controller is further configured to control an output power of the trolling motor and a directional heading of the watercraft via the trolling motor, the main controller having an electronic interface configured to establish a two-way data connection between the main controller and an electronic GPS-equipped mapping device such that the main controller can use data stored on the GPS-equipped mapping device to execute functions of the trolling motor control system, and such that functions of the trolling motor control system can be executed via controls on the GPS-equipped mapping device; and a wireless remote control device having a display screen and input means, the wireless remote control device configured to wirelessly communicate with the main controller to cause, via the input means, the main controller to execute functions of the trolling motor control system;

wherein the wireless remote control device is configured to display a copy of that being displayed on the GPS-equipped mapping device display.

6. The trolling motor control system of claim 3, wherein the wireless remote control device is configured to control the GPS-equipped mapping device such that the user can remotely control standard functions on the GPS-equipped mapping device.

7. The trolling motor control system of claim 6, wherein one of the standard functions on the GPS-equipped mapping device is to record a track or series of waypoints.

8. A trolling motor control system comprising:
a main controller configured to interface with a trolling motor for a watercraft, wherein the main controller is further configured to control an output power of the trolling motor and a directional heading of the watercraft via the trolling motor, the main controller having an electronic interface configured to establish a two-way data connection between the main controller and an electronic GPS-equipped mapping device such that the main controller can use data stored on the GPS-equipped mapping device to execute functions of the trolling motor control system, and such that functions of the trolling motor control system can be executed via controls on the GPS-equipped mapping device; and
a wireless remote control device having a display screen and input mean, the wireless remote control device configured to wirelessly communicate with the main controller to cause, via the input means, the main controller to execute functions of the trolling motor control system;
wherein the wireless remote control device is configured to change the display screen on the GPS-equipped mapping device.

9. A trolling motor control system comprising:
a main controller configured to interface with a trolling motor for a watercraft, wherein the main controller is further configured to control an output power of the trolling motor and a directional heading of the watercraft via the trolling motor, the main controller having an electronic interface configured to establish a two-way data connection between the main controller and an electronic GPS-equipped mapping device such that the main controller can use data stored on the GPS-equipped mapping device to execute functions of the trolling motor control system, and such that functions of the trolling motor control system can be executed via controls on the GPS-equipped mapping device; and
a wireless remote control device having a display screen and input means, the wireless remote control device configured to wirelessly communicate with the main controller to cause, via the input means, the main controller to execute functions of the trolling motor control system;

wherein the wireless remote control device includes software that can be modified using the GPS-equipped mapping device.

10. The trolling motor control system of claim 1, wherein the data stored on the GPS-equipped mapping device comprises a recorded waypoint, or a series of recorded waypoints that constitute a track.

11. The trolling motor control system of claim 1, wherein the main controller is configured to execute a Spot-Lock function, wherein the trolling motor is operated to keep the watercraft at a selected waypoint when the watercraft is not anchored.

12. The trolling motor control system of claim 1, wherein the main controller is configured to execute a Track-to-Start function, wherein the trolling motor is operated to cause the watercraft to follow a recorded track from a present position to the first waypoint in the track.

13. The trolling motor control system of claim 12, wherein the main controller is configured to execute a Track-to-End function, wherein the trolling motor is operated to cause the watercraft to follow a recorded track from a present position to the last waypoint in the track.

14. The trolling motor control system of claim 1, wherein the main controller is configured to execute an autopilot feature that causes the trolling motor to automatically maintain a predetermined heading for the watercraft and to correct for any effects of wind, waves or currents on that heading.

15. The trolling motor control system of claim 1, wherein the main controller is configured to execute a Navigate-To function that causes the trolling motor to navigate the watercraft from a present position to a selected waypoint.

16. The trolling motor control system of claim 1, wherein the main controller includes a main control module, a GPS receiver, an electronic compass, and a wireless interface.

17. The trolling motor control system of claim 1, wherein the main controller is configured to be mounted to the trolling motor.

18. The trolling motor control system of claim 1, wherein the main controller is configured to be mounted to an operator's console.

19. The trolling motor control system of claim 1, wherein the GPS-equipped mapping device is one of a chart plotter and an electronic fish finder.

20. A method of controlling a trolling motor on a watercraft, the method comprising the steps of:
configuring a module of a trolling motor control system to transmit control signals to the trolling motor for controlling an output power of the trolling motor and a directional heading of the watercraft via the trolling motor;
establishing a two-way data link between the trolling motor control system and an electronic GPS-equipped mapping device; and
configuring the trolling motor control system to use the two-way data link to access data stored on the electronic GPS-equipped mapping device in order to execute functions of the trolling motor control system, and wherein the data stored on the GPS-equipped mapping device comprises one or more maps which can be displayed on an electronic display screen.

21. The method of claim 20, further comprising using user input controls on the electronic GPS-equipped mapping device to execute functions of the trolling motor control system.

22. The method of claim 20, further comprising executing functions of the trolling motor control system using a wireless remote control device.

23. The method of claim 20, wherein configuring a module of a trolling motor control system to transmit signals to the trolling motor comprises configuring a module of a trolling motor control system to wirelessly transmit signals to the trolling motor.

24. The method of claim 20, wherein executing functions of the trolling motor control system comprises controlling the trolling motor causing it to perform a spot-lock function.

25. The method of claim 20, wherein executing functions of the trolling motor control system comprises controlling the trolling motor causing it to perform an autopilot function.

26. The method of claim 20, wherein executing functions of the trolling motor control system comprises controlling the trolling motor causing it to follow a recorded track to the starting point for the track.

27. The method of claim 20, wherein executing functions of the trolling motor control system comprises controlling the trolling motor causing it to follow a recorded track to the end point for the track.

28. The method of claim 20, wherein executing functions of the trolling motor control system comprises controlling the trolling motor causing it to navigate from a present position to a selected waypoint.

29. The method of claim 20, further comprising coupling the module of the trolling motor control system to the trolling motor.

30. The method of claim 20, further comprising coupling the module of the trolling motor control system to an operator's console.

31. The method of claim 20, wherein establishing a two-way data link between the trolling motor control system and an electronic GPS-equipped mapping device comprises establishing a wireless two-way data link between the trolling motor control system and an electronic GPS-equipped mapping device.

32. The method of claim 31, wherein establishing a wireless two-way data link between the trolling motor control system and the electronic GPS-equipped mapping device comprises connecting a wireless interface to a port of the GPS-equipped mapping device.

33. A trolling motor configured to be used on a boat, the trolling motor comprising:
one or more mechanisms for the manual control of the speed and direction of the trolling motor; and
a control system for regulating operation of the trolling motor, the control system comprising:
a main controller configured to control an output power of the trolling motor and a directional heading of the watercraft via the trolling motor, the main controller having an electronic interface configured to establish a two-way data connection between the main controller and an electronic GPS-equipped mapping device such that the main controller can use data stored on the GPS-equipped mapping device to execute functions of the trolling motor, and such that functions of the trolling motor can be executed via controls on the GPS-equipped mapping device;
wherein the data stored on the GPS-equipped mapping device comprises one or more maps which can be displayed on an electronic display screen.

34. The trolling motor of claim 33, wherein the functions of the trolling motor can be executed using a wireless remote control device having a display screen and input means, the wireless remote control device configured to wirelessly communicate with the main controller to cause, via the input means, the main controller to execute functions of the trolling motor.

35. The trolling motor of claim 34, wherein the wireless remote control device is configured to cause the GPS-equipped mapping device to record one or more waypoints, and wherein the wireless remote control device is configured to display a copy of that being displayed on the GPS-equipped mapping device display, and wherein the wireless remote control device is configured to control the GPS-equipped mapping device such that the user can remotely control standard functions on the GPS-equipped mapping device, and wherein the wireless remote control device includes software that can be modified using the GPS-equipped mapping device.

36. The trolling motor of claim 33, wherein the main controller includes a main control module, a GPS receiver, an electronic compass, and a wireless interface.

37. The trolling motor of claim 33, wherein the data stored on the GPS-equipped mapping device comprises a recorded waypoint, or a series of recorded waypoints that constitute a track.

38. The trolling motor of claim 33, wherein functions of the trolling motor include a Spot-Lock function in which the trolling motor is operated to keep the watercraft at a selected waypoint when the watercraft is not anchored.

39. The trolling motor of claim 33, wherein functions of the trolling motor include a Track-to-Start function in which the trolling motor is operated to cause the watercraft to follow a recorded track from a present position to the first waypoint in the track.

40. The trolling motor of claim 33, wherein functions of the trolling motor include a Track-to-End function in which the trolling motor is operated to cause the watercraft to follow a recorded track from a present position to the last waypoint in the track.

41. The trolling motor of claim 33, wherein functions of the trolling motor include an autopilot function in which the trolling motor is operated to automatically maintain a predetermined heading for the watercraft and to correct for any effects of wind, waves or currents on that heading.

42. The trolling motor of claim 33, wherein functions of the trolling motor include a Navigate-To function in which the trolling motor navigates the watercraft from a present position to a selected waypoint.

43. The trolling motor of claim 33, wherein the electronic interface is a wireless electronic interface.

* * * * *

UNITED STATES PATENT AND TRADEMARK OFFICE
CERTIFICATE OF CORRECTION

PATENT NO. : 8,761,976 B2  
APPLICATION NO. : 13/174944  
DATED : June 24, 2014  
INVENTOR(S) : Paul D. Salmon Page 1 of 1

It is certified that error appears in the above-identified patent and that said Letters Patent is hereby corrected as shown below:

In the Claims

Column 11, Line 39, Claim 8, "mean" should be changed to --means--

Signed and Sealed this  
Third Day of February, 2015

Michelle K. Lee  
*Deputy Director of the United States Patent and Trademark Office*